United States Patent [19]
Yamauchi

[11] Patent Number: 5,341,775
[45] Date of Patent: Aug. 30, 1994

[54] EXHAUST TIMING CONTROLLER FOR TWO-STROKE CYCLE ENGINE

[75] Inventor: Kosaku Yamauchi, Shizuoka, Japan

[73] Assignee: Suzuki Kabushiki Kaisha, Shizuoka, Japan

[21] Appl. No.: 56,895

[22] Filed: May 5, 1993

[30] Foreign Application Priority Data

Dec. 28, 1992 [JP] Japan .................. 4-349118

[51] Int. Cl.⁵ ............................. F02B 25/20
[52] U.S. Cl. ..................... 123/65 PE; 123/65 V
[58] Field of Search ............ 123/65 PE, 65 P, 65 V

[56] References Cited

U.S. PATENT DOCUMENTS

| | | |
|---|---|---|
| 4,391,234 | 7/1983 | Holzleitner .................. 123/65 V |
| 4,751,899 | 6/1988 | Ohki et al. .................. 123/65 PE |
| 4,807,571 | 2/1989 | Yamamoto et al. ........... 123/65 PE |
| 4,829,945 | 5/1989 | Yamamoto et al. ........... 123/65 PE |
| 4,903,647 | 2/1990 | Yamamoto et al. ........... 123/65 PE |

*Primary Examiner*—Tony M. Argenbright
*Assistant Examiner*—M. Macy
*Attorney, Agent, or Firm*—Finnegan, Henderson Farabow, Garrett & Dunner

[57] ABSTRACT

An exhaust timing controller for a two-stroke cycle engine includes an exhaust timing control valve for changing a height of an open edge portion on a top dead center side of an exhaust port opening to an inside wall surface of a cylinder bore in the engine. The exhaust timing control valve moves axially of the cylinder bore by power from an actuator and the exhaust timing is accelerated in response to rotational frequency rises in the engine. The power of the actuator is transformed into an elevating stroke of the exhaust timing control valve by the eccentric motion of an eccentric cam. A slider mechanism for transferring an eccentric motion of the eccentric cam to the exhaust timing control valve is provided between the eccentric cam and the exhaust timing valve. A straightening member extends smoothly from a portion of the exhaust timing control valve, which retracts into the exhaust port, on the downstream side of the exhaust port. An upstream side end portion of the straightening member pivots on the exhaust timing control valve. A downstream side end portion of the straightening member slidably and pivotally engages with an inside wall portion of the exhaust port.

16 Claims, 6 Drawing Sheets

EXHAUST TIMING CONTROLLER FOR TWO-STROKE CYCLE ENGINE

BACKGROUND OF THE INVENTION

The present invention relates to an exhaust timing controller for a two-stroke cycle engine constructed to change an exhaust timing according to a rotational frequency of the engine.

It is well known in the two-stroke cycle engine art that higher power covering the whole rotational frequency range is obtainable by delaying the exhaust timing during low-speed rotation and quickening the exhaust timing during increased rotational frequency.

A conventional exhaust timing controller for adjusting the exhaust timing includes a construction wherein an exhaust timing control valve is provided in the vicinity of an open portion of an exhaust port opening to the inside wall surface of a cylinder bore. The exhaust timing control valve is driven by an actuator such as servomotor or the like, thereby changing a height of an open upper edge portion, i.e. edge portion on the top dead center side, of the exhaust port.

In the case of such an exhaust timing controller, the tendency is such that when an open upper edge portion of the exhaust port gets high or shifts to the top dead center side, the exhaust timing quickens and an engine characteristic assumes a high-speed rotation. However, when the open upper edge portion of the exhaust port gets low or shifts to the bottom dead center side, the exhaust timing is delayed and the engine characteristic assumes a low-speed rotation.

Meanwhile, a driving mode of the exhaust timing control valve in a conventional exhaust timing controller generally comprises driving the exhaust timing control valve directly by the power of an actuator (or directly through a rod or other means), or by reducing the power of the actuator by means of a reduction gear.

However, in cases where the exhaust timing control valve is driven directly or through available means therefor by the actuator, a driving force sufficient enough to activate the exhaust timing control valve when a high exhaust pressure is applied to the exhaust timing control valve will be necessary, One example is where a two-stroke cycle engine runs slow on a high load. Therefore, the actuator must be constructed to a large size.

On the other hand, in cases where the exhaust timing control valve is driven by reducing the power of the actuator, a driving force of the actuator increases to miniaturize the actuator, However, lost motion easily arises on the exhaust timing control valve due to a backlash of the reduction gear. The position of the exhaust timing control valve at elevating stroke opposite end portions, i.e. activating portions, may be inaccurate, and an excessively high cost will be required for machining the reduction gear and other additional parts.

Moreover, in the conventional exhaust timing controller, since the exhaust timing control valve protrudes largely into the exhaust port when the two-stroke cycle engine runs slow, a drop in level causes the downstream side of the exhaust timing control valve to cause a big disturbance of a flowing exhaust gas. Thus, the exhaust gas flows harder and output consequently drops.

SUMMARY OF THE INVENTION

An object of the present invention is to substantially eliminate defects or drawbacks encountered in the prior art. Another object of the present invention is to provide an exhaust timing controller for a two-stroke cycle engine which functions to allow a small-sized actuator to actuate the exhaust timing control valve smoothly.

Another object of the present invention is to provide an exhaust timing controller for a two-stroke cycle engine that prevents disbursing an exhaust gas flow on the downstream side of an exhaust timing control valve protruding into an exhaust port when the two-stroke cycle engine runs slow.

These and other objects can be achieved according to the present invention, in a broader aspect, by providing an exhaust timing controller for a two-stroke cycle engine having an exhaust timing control valve for changing a height of an open edge portion on a top dead center side of an exhaust port. The exhaust port opens to an inside wall surface of a cylinder bore formed to a cylinder in the engine. The exhaust timing control valve is moved axially of the cylinder bore by the power of an actuator. Exhaust timing accelerates in response to rotational frequency rises in the engine, wherein the power of the actuator is transformed into an elevating stroke of the exhaust timing control valve in response to an eccentric motion of an eccentric cam.

In a preferred embodiment, an exhaust timing controller is used with a two-stroke cycle engine including a cylinder head, a cylinder block having a cylinder bore, and a crank case. The crank case has a scavenging port and an exhaust port opened to an inside wall surface of the cylinder bore. The exhaust timing controller comprises:

an actuator;
a housing member disposed above the exhaust port;
an exhaust timing control valve disposed between the housing member and the cylinder block and adapted to change a height of an open edge portion on a top dead center side of the exhaust port; and
means for transferring power from the actuator to the exhaust timing control valve, the power transferring means comprising a cam shaft disposed in the housing member and operatively connects at one end of the cam shaft to the actuator, and an eccentric cam member mounts on the other one end of the cam shaft and engages the exhaust timing control valve.

In a preferred embodiment, a valve holder is disposed between the housing member and the cylinder block and the exhaust timing control valve is held by the valve holder. The exhaust timing control valve comprises a sliding member having a thickness smaller than that of the valve holder so as to be slidable between the cylinder block and the housing member, and a valve body that moves with the sliding motion of the sliding member.

The power transferring means further includes a slider mechanism disposed between the eccentric cam member and the exhaust timing control valve and adapted to transfer an eccentric motion of the eccentric cam member to the exhaust timing control valve through a face contact. The sliding member has a recessed portion for horizontally accommodating a slider. The slider has a substantially circular hole corresponding to an outer profile of the eccentric cam member. The eccentric cam member is tightly fitted into the circular hole of the slider for rotation. The sliding member has a substantially rectangular shape with a groove formed along one side edge. The groove opens toward the cam shaft. A pivot axis of a straightening member fits into the groove. The opened sides of the recessed portion and the groove of the sliding member are closed by a back shim. The cam shaft extends through a through hole in the back shim. The straightening member has a free end slidably and pivotally contacting a wall portion of the exhaust port through another slider mechanism.

The power transferring means further includes a pulley mounted on the one end of the cam shaft. A cable means is wound around the pulley at one end of the cable means and connected to the actuator at the other end of the cable means.

In the exhaust timing controller for the two-stroke cycle engine described above, the eccentric cam is rotated by power from the actuator. The exhaust timing control valve moves vertically in response to the motion of the eccentric cam. The height of the open edge portion on the top dead center side of the exhaust port changes to adjust the exhaust timing of the two-stroke cycle engine.

As described above, the exhaust timing control valve moves vertically on the eccentric cam. Since a backlash usually rises when a reduction gear is used, it may be removed. The exhaust timing control valve operates smoothly without lost motion and may be activated by a small force, therefore the actuator can be miniaturized. Furthermore, the position of the exhaust timing control valve at elevated stroke opposite end portions is determined more accurately, and the exhaust timing controller can be constructed at a moderate cost.

Furthermore, the slider mechanism for transferring the motion of the eccentric cam to the exhaust timing control valve by face contact is provided between the eccentric cam and the exhaust timing control valve. The cam member of the eccentric cam, the slider of the slider mechanism, and the exhaust timing control valve make face contact with each other. Hence, the durability of the cam member and the sliding portion around the slider is enhanced and fouling and other detects are prevented.

Moreover, depending on the location of the straightening member of the present invention, the exhaust gas within the exhaust port flows smoothly when the two-stroke cycle engine has a low speed rotation, thereby enhancing the exhaust efficiency to a high output.

BRIEF DESCRIPTION OF THE DRAWINGS

For a better understanding of the present invention and to show how the same is carried out, reference is made, by way of the preferred embodiment, to the accompanying drawings, in which:

FIGS. 2A and 2B represent an embodiment of the present invention, wherein FIG. 2A shows a high-speed state of an exhaust timing controller and FIG. 2B shows a low-speed state of the exhaust timing controller;

Figure 2A:
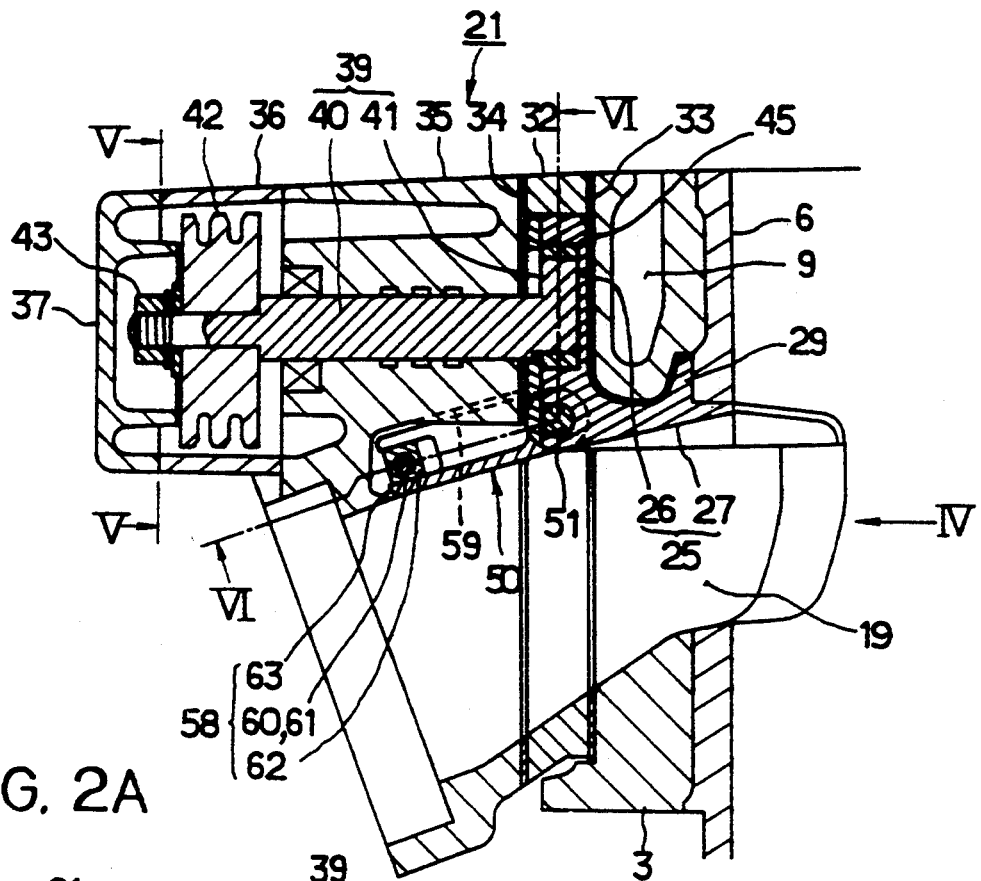
Figure 6:
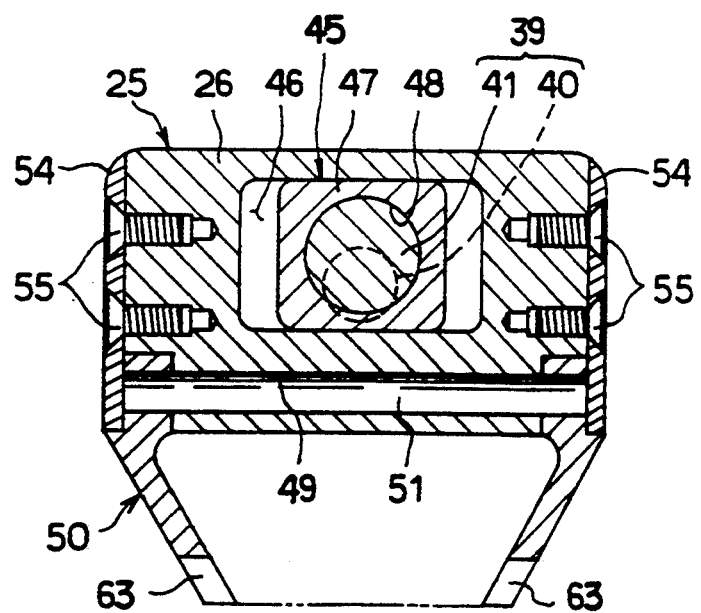
Figure 7:
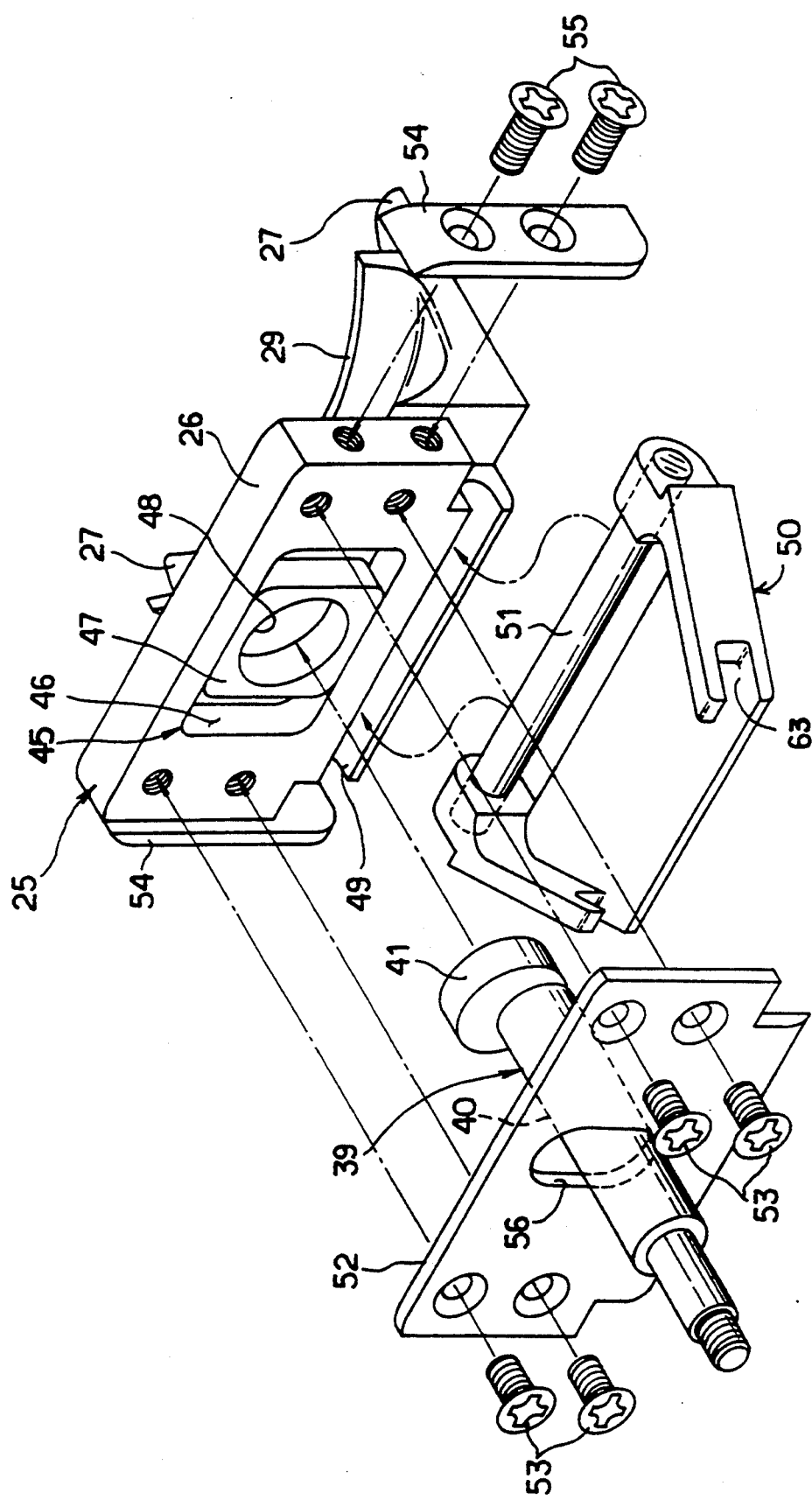
Figure 8:
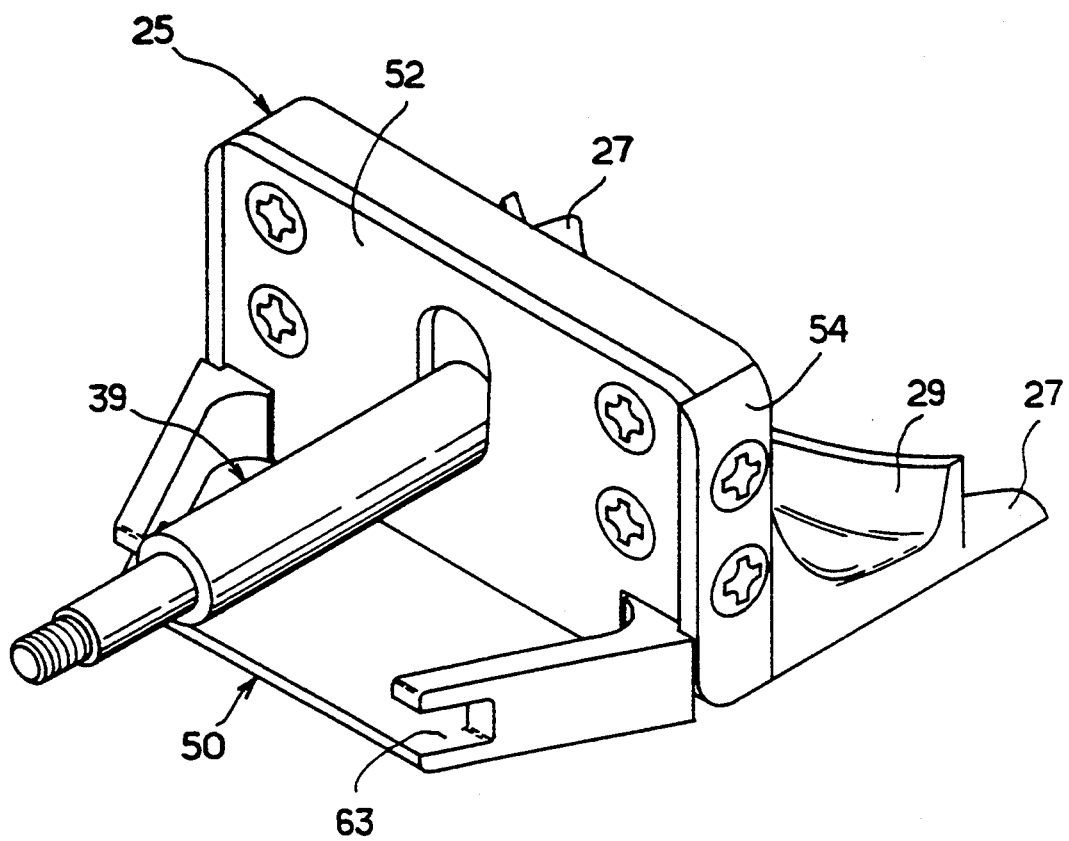

5 is a cross-sectional view taken along the line V—V of FIG. 2A;

FIG. 6 is a cross-sectional view taken along the line VI—VI of FIG. 2A;

FIG. 7 is an exploded perspective view showing a valve body and associated members of the present invention; and FIG. 8 is a perspective view of an assembly of the members of FIG. 7.

DESCRIPTION OF THE PREFERRED EMBODIMENT

One embodiment of the present invention will now be described with reference to the accompanying drawings.

Figure 1:
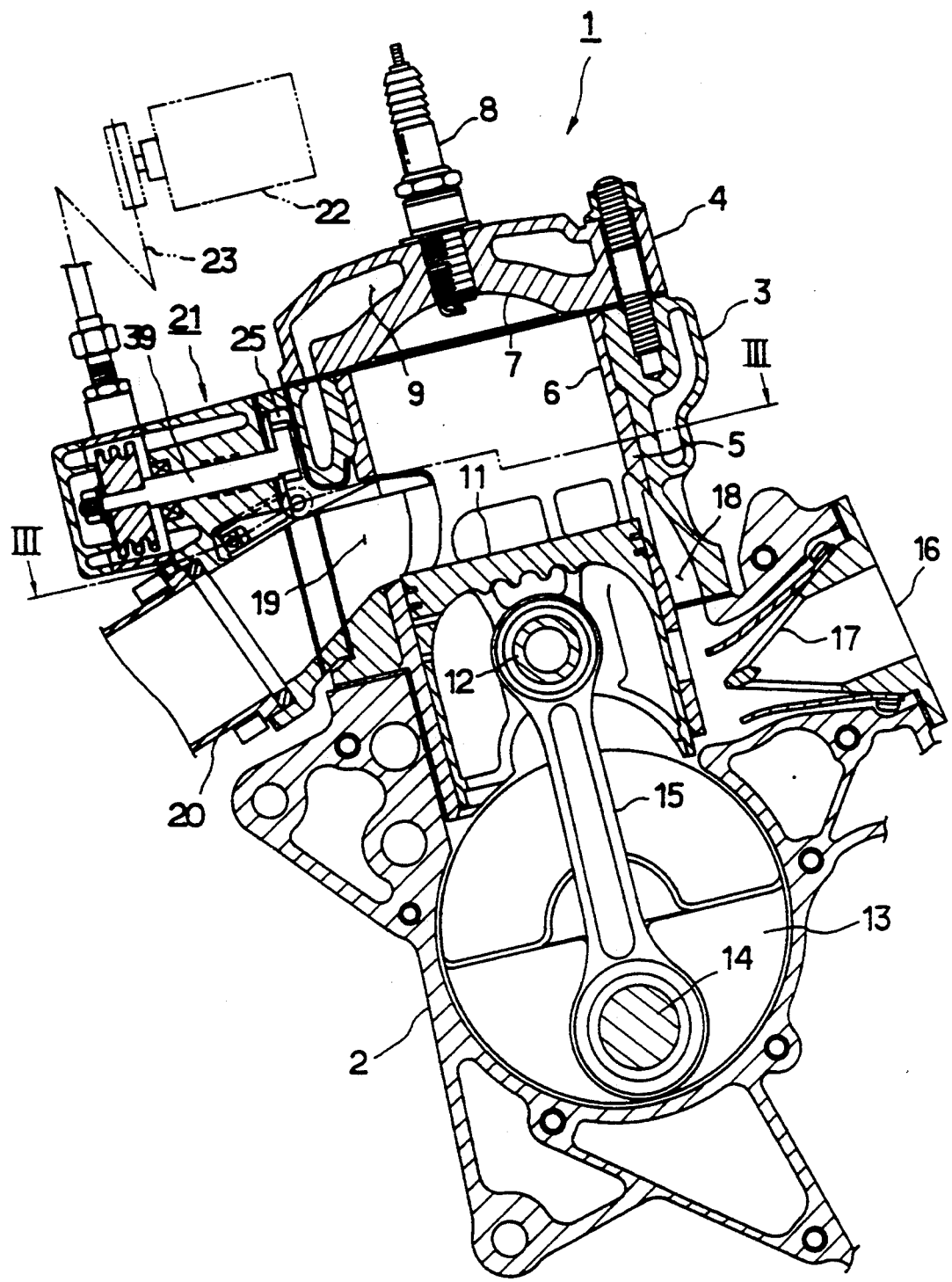
FIG. 1 is a longitudinal sectional view of a two-stroke cycle engine with the present invention applied.

FIG. 1 is a longitudinal sectional view of a two-stroke cycle engine with the present invention applied- The two-stroke cycle engine 1 is a water-cooled single cylinder type that may be mounted, for example, on a motorcycle. The engine has a cylinder block 3 and a cylinder head 4 sequentially attached to the top of a crank case 2.

A cylinder liner 5 is provided within the cylinder block 3, and a cylinder bore 6 is formed in the cylinder liner 5. Further, a combustion chamber 7 mates with the cylinder bore 6 and is formed in the cylinder head 4. An ignition plug 8 screws into the central portion of the cylinder head 4. A water jacket 9 formed around the cylinder bore 6 and the combustion chamber 7 circulates cooling water.

A piston 11 is slidably inserted into the cylinder bore 6. A piston pin 12 on the piston 11 and a crank pin 14 of a crankshaft 13 are rotatably journaled within the crank case 2 and coupled together by a connection rod 15.

A suction port 16 and a lead valve 17 are provided in the crank case 2. A carburetor, not indicated in the illustration, is coupled to the suction port 16.

A plurality of scavenging ports 18 ascend from the inside of the crank 2, along the cylinder liner 5, and open to an inside wall surface of the cylinder bore 6.

An exhaust port 19 opens to the inside wall surface of the cylinder bore 6 at a position somewhat higher than the scavenging ports 18. The exhaust port 19 passes through the cylinder block 3 to the exterior of the block. An exhaust muffler 20 connects to the outlet of the exhaust port 19.

An exhaust timing controller 21 is provided on the exhaust port 19. The exhaust timing controller 21 includes an actuator 22 such as a servomotor or the like, and a cable mechanism 23 for transferring power from the actuator 22.

Figure 2B:
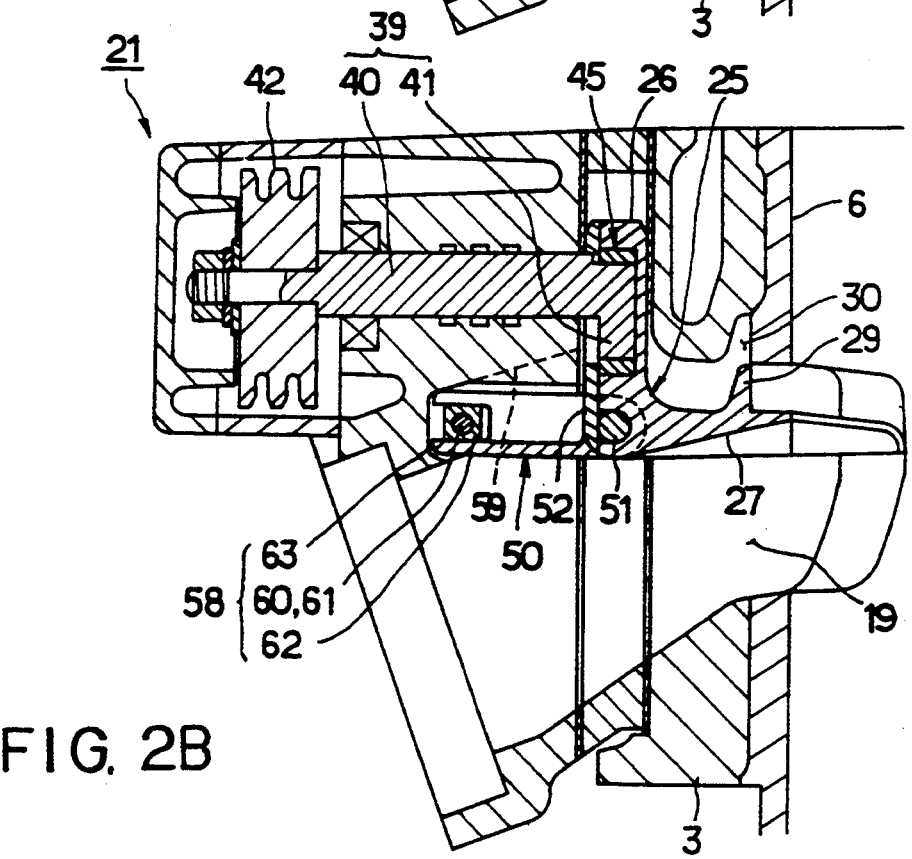

FIGS. 2A and 2B are enlarged views of the exhaust timing controller 21, representing one embodiment of the present invention.

An exhaust timing control valve 25 for changing the height of an open edge portion on the top dead center side of the exhaust port 19 is incorporated in the exhaust timing controller 21. The exhaust timing control valve 25 includes a slider 26 constructed in the for of a flat plate and a valve body 27 formed integrally with the slider 26.

Figure 3:
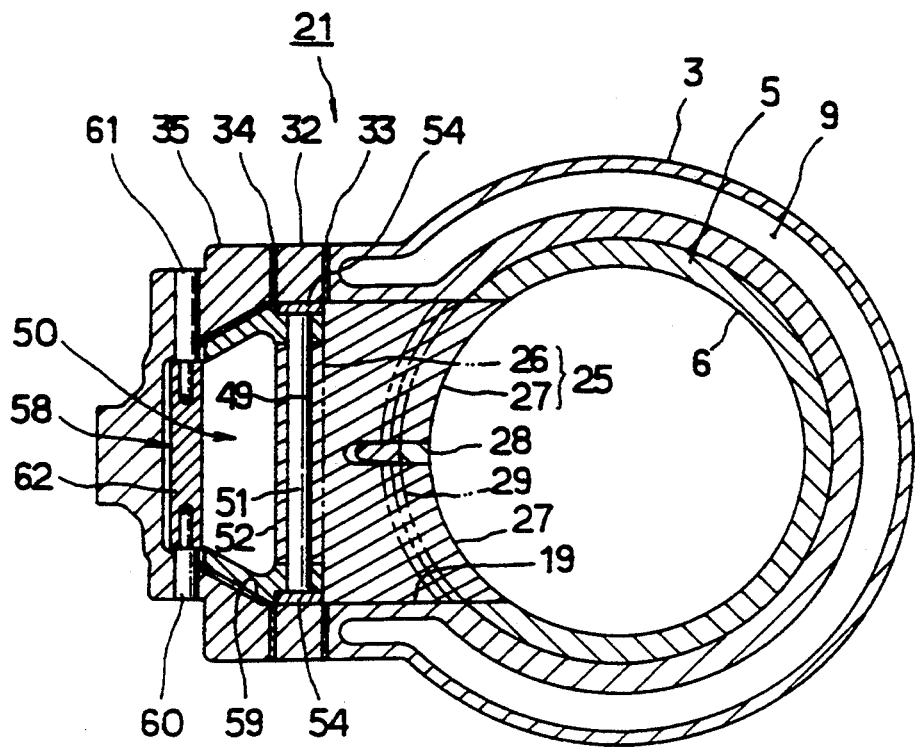
FIG. 3 is a cross-sectional view taken along the line III—III of FIG. 1.

The slider 26 is parallel axially of the cylinder bore 6, side-viewed as shown in FIG. 1 and FIG. 2, and orthogonal to the exhaust port 19, plane-viewed as shown in FIG. 3, thus being liftable axially of the cylinder bore 6.

Figure 4:
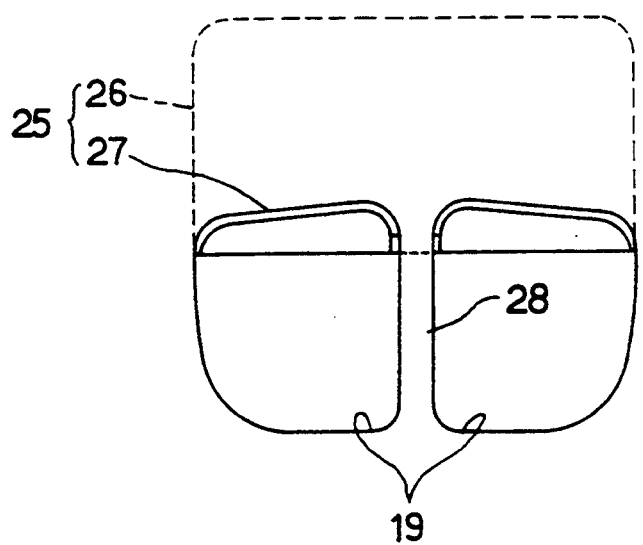
FIG. 4 is a cross-sectional view taken in a direction indicated by an arrow IV of FIG. 2A.

On the other hand, the valve body 27 extends from a lower edge portion of the slider 26 toward an open portion of the exhaust port 19 and its nose portion is R-like in shape to cope with the curvature of the cylinder bore 6. As shown in FIG. 3 and FIG. 4, the exhaust port 19 is bilaterally divided into two portions by a center bridge 28. Therefore, the valve body 27 is provided in a pair with its sectional form made to cope with the top shape of a passage of each exhaust port 19. As shown in FIG. 2A and FIG. 4, the valve body 27 comes close to the top of the passage of the exhaust port 19 when the slider 26 is in its uppermost position.

A flange 29 parallel with the curved surface of the cylinder bore 6 is integrally formed on the upper surface of the valve body 27. The flange 29 moves in and out of a recess 30 in the cylinder block 3, as shown in FIG. 2B. The height of the flange 29 is kept even or over with an elevating stroke of the slider 26. As shown in FIG. 2B, the flange 29 is constructed so that it does not come out of the recess 30 when the slider 26 is in its lowermost position.

A valve holder 32 made slightly thicker than the slider 26 is fixed to the cylinder block 3 through a gasket 33. A valve housing 35 is fixed to the valve holder 32 through a gasket 34. The exhaust port 19 passes through the valve holder 32, the valve housing 35, and the gaskets 33, 34. Then, a pulley cover 36 and a cap 37 are fixed to the valve housing 35 in that order.

Since the slider 26 is slightly thinner than the valve holder 32, the slider 26 of the exhaust timing control valve 25 slides between the cylinder block 3 and the valve housing 35. The valve body 27 shifts axially of the cylinder as the slider 26 slides. Thus, the height of the edge portion on the top dead center side of the open portion of the exhaust port 19 changes to adjust an exhaust timing of the two-stroke cycle engine 1. In this connection, FIG. 2A illustrates a high-speed rotation state where the exhaust timing is faster. FIG. 2B illustrates a low-speed rotation state where the exhaust timing is delayed.

The exhaust timing control valve 25 moves vertically in response to the power from the actuator 22. The exhaust timing control valve 25 ascends in response to rotational frequency increases of the two-stroke cycle engine 1, thus accelerating the exhaust timing. The power of the actuator 22 is transformed into an elevating stroke of the exhaust timing control valve 25 by an eccentric cam 39.

A cam shaft 40 of the eccentric cam 39 is rotatably journaled within the valve housing 35. A circular cam portion 41 is formed on one end of the cam shaft 40 eccentrically with reference to the axis of the cam shaft 40. A pulley 42 is rotatably fixed to the other end of the cam shaft by means of nut 43.

Figure 5:
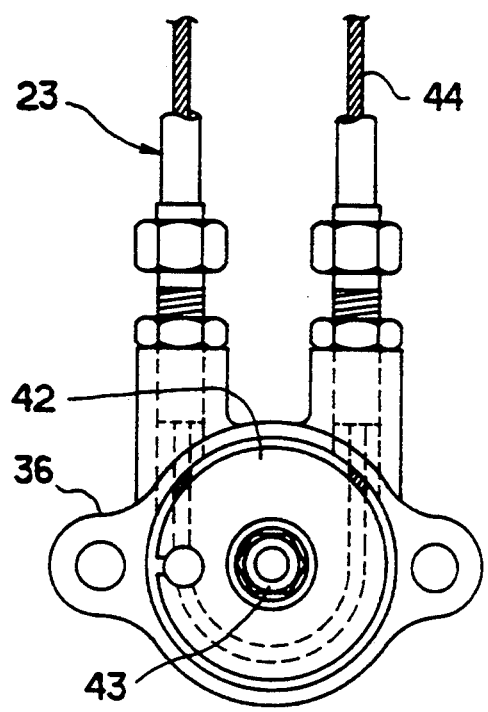

A cable 44 of the cable mechanism 23 winds around the pulley 42, as illustrated in FIG. 5. The power of the actuator 22 transfers to the pulley 42 through the cable 44 to rotate the eccentric cam 39.

As indicated in FIG. 6 and FIG. 7, a slider mechanism 45 is between the eccentric cam 39 and the exhaust timing control valve 25. The slider mechanism 45 functions to transfer an eccentric motion of the cam portion 41 of the eccentric cam 39 to the exhaust timing control valve 25 through a face contact.

A slider chamber 46 of substantially rectangular shape, is provided in the slider 26 of the exhaust timing control valve 25. A slider 47 fits in the slider chamber 46, as a recessed portion, horizontally sliding in such manner as will be free from lost vertical motion. A circular cam hole 48 perforates the slider 47, and the cam portion 41 of the eccentric cam 39 inserts into the cam hole 48. The outer profile of the cam portion 41 rotatably coincides with the cam hole 48 so as to be free from lost motion.

Thus, when the cam shaft 40 is rotated by the power from the actuator 22, the cam portion 41 rotates in the cam hole 48 of the slider 47, and the exhaust timing control valve 25 ascends at a stroke two times as high as the eccentricity of the cam portion 41.

Meanwhile, a groove 49 extends horizontally along a lower end portion of the slider 26 on the same side as the slider chamber 46. A pivotal shaft 51 of a straightening or commutating member 50, which will be described hereinafter, rotatably fits in the groove 49. Further, a back shim 52 locks to a face of the slider 26 on the side where the cam chamber 46 and the groove 49 are formed by, for example, four screws 53. Side shims 54 are locked to opposite sides of the slider 26 by, for example, two screws 55.

A longitudinally elongated circular hole 56 is bored in the back shim 52. The cam shaft 40 inserts into the elongated circular hole 56. Thus, the eccentric cam 39 and the slider 47 are incorporated in the slider chamber 46 by the back shim 52. Further, the pivotal shaft 51 is retained within the groove 49 by the back shim 52, and its axial sliding is controlled by the left and right side shims 54 at the same time.

The aforementioned straightening or commutating member 50 is connected to a portion of the exhaust timing control valve 25 where the exhaust timing control valve 25 moves in and out of the exhaust port 19. Namely, the straightening member 50 provides a lower edge portion of the slider 26. The straightening member 50 extends smoothly from the lower edge portion of the slider 26 toward a downstream side of the exhaust port 19. An upstream side end portion of the straightening member 50 pivots on the slider 26 by the pivotal shaft 51. A downstream side end portion of the straightening member 50 slidably engages and also rotates with an inside wall portion of the exhaust port 19 through a slider mechanism 58.

As shown in FIGS. 2A, 2B, and 3, a straightening member containing recess 59 is formed on an upper surface of the inside wall portion of the exhaust port 19. The slider mechanism 58 comprises pivots 60 and 61 that protrude left and right at the downstream side end portion of the straightening member containing recess 59. A slider 62 angular in section is rotatably journaled to the pivots 60 and 61, and a pair of gripper portions 63 are horizontally positioned on the downstream side end portion of the straightening member 50, as shown in FIGS. 7 and 8. The gripper portions 63 have slidable gripping opposite end portions of the slider 62 and are free of lost motion.

When the exhaust timing control valve 25 is positioned uppermost, as shown in FIG. 2A, the straightening member 50 is in the straightening member containing recess 59. An upper surface of the passage of the exhaust port 19 forms the lower surface of the valve body 27 and a lower surface of the straightening member 50 connects smoothly to the valve body 27. In this case, the cross-sectional area of the passage of the exhaust port 19 is maximized, thus allowing more exhaust gas to flow.

Further, when the exhaust timing control valve 25 moves lowermost in position, as shown in FIG. 2B, an upstream side end portion of the straightening member 50 is drawn out of the straightening member containing recess 59. In this case, a downstream side end portion of the straightening member 50 turns on the pivots 60 and 61 together with the slider 62, and the distance between the pivotal shaft 51 and the pivots 60 and 61 becomes shorter than the state indicated in FIG. 2A. Accordingly, the gripper portions 63 of the straightening member 50 and the slider 62 slide to absorb the difference in the distance mentioned above.

In this state, the straightening member 50 extends smoothly to the downstream side of the exhaust timing control valve 25 projecting largely into the exhaust port 19, therefore the level never drops on the downstream side of the exhaust timing control valve 25. Hence the exhaust gas flow is not disturbed. Consequently, the exhaust gas flow is improved and the output at the time of a low-speed rotation of the two-stroke cycle engine 1 may be enhanced.

In this connection, when the exhaust timing control valve 25 descends, as shown in FIG. 2B, the flange 29 on an upper surface of the valve body 27 functions as a stopper of the exhaust gas, thus preventing the exhaust gas from flowing into the sliding portion or around the exhaust timing control valve 25.

In the exhaust timing controller 21 constructed as above, the power of the actuator 22 is transformed into an elevating stroke of the exhaust timing control valve 25 by the eccentric cam 39. Therefore, by setting the exhaust timing control valve 25 to ascend or descent for the total strokes by rotating the eccentric cam 39 by 180° as in the present embodiment, the moving rate of the exhaust timing control valve 25 is minimized in the vicinity of vertical end portions of the elevating stroke of the exhaust timing control valve 25 as compared to the magnitude of the turning angles of the eccentric cam 39.

Accordingly, the exhaust timing control valve 25 is driven with decreasing velocity in the vicinity of vertical end portions of its elevating stroke, and hence a satisfactory starting power is obtainable even by miniaturizing the actuator 22. Thus, even when a high exhaust pressure is applied to the exhaust timing control valve 25, for example, when the two-stroke cycle engine 1 runs slow particularly on a high load, the exhaust timing control valve 25 is activated smoothly with a small driving force.

Accordingly, the driving force of the actuator 22 does not need to be increased by means of a reduction gear as before, and hence, the exhaust timing controller 21 can be inexpensively constructed. Additionally, since the gear teeth are free from backlash with each other, unlike the case where a reduction gear is used, the exhaust timing control valve 25 operates without lost motion. Therefore, the exhaust timing control valve 25 can be accurately positioned at opposite end portions of the elevating stroke (a dispersion during engine assembly is minimized).

Further, since the slider mechanism 45 is between the eccentric cam 39 and the exhaust timing control valve 25, the cam portion 41 of the eccentric cam 39, the slider 47 and the exhaust timing control valve 25 all come in face contact with each other. Accordingly, the contact pressure at work among these members 41, 47 and 25 is minimized and fouling and other defects are thus effectively prevented.

Therefore, the moving motion of the exhaust timing control valve 25 is kept smooth. The material of the exhaust timing control valve 25, the slider 26 and the valve body 27 may be replaced by another material such as light alloy or the like, thus contributing to a lightweight construction for the two-stroke cycle engine 1.

Additionally, if an oil-containing material is applied to the material of the slide 47, the motion of the exhaust timing control valve 25 causing an increase in temperature can be made smoother and the durability of the sliding portion can be simultaneously enhanced.

On the other hand, the installation of the straightening member 50 on the exhaust timing control valve 25 smooths the flow of exhaust gas within the exhaust port 19 when the two-stroke cycle engine 1 is at a low-speed rotation, thereby enhancing an exhaust efficiency to a high output.

Further, the straightening member 50, the slider 62, and the pivots 60 and 61 all come in face contact with each other, and thus, the wear resistance may be sharply enhanced. Therefore, a material such as light alloy or the like may be used on the straightening member 50 contributing to a lightweight construction. In this connection, durability can be further enhanced by applying an oil-containing material to the slider 62.

According to the present invention of the structures described hereinabove, various advantageous effects, which were described hereinbefore, can be achieved over the prior art.

What is claimed is:

1. An exhaust timing controller for a two-stroke cycle engine having a crank case, a cylinder block with a cylinder bore providing an inside wall surface, and a cylinder head, the crank case having a scavenging port having a suction end and an opposite end opening to the inside wall surface of the cylinder bore, an exhaust port passing through the cylinder block from the inside wall surface of the cylinder bore to the exterior of the block, the exhaust port having an open edge portion opening into the cylinder bore, the exhaust timing controller comprising:

an actuator for transmitting power;
   an eccentric cam being operatively connected to and driven by the actuator; and
   an exhaust timing control valve for changing the height of the open edge portion on the top dead center side of the exhaust port, the exhaust timing control valve moving axially of the cylinder bore and in and out of the exhaust port by the motion of the eccentric cam to provide an elevating stroke of the exhaust timing control valve, whereby the exhaust timing of the engine accelerates in response to rotational frequency rises in the engine.

2. An exhaust timing controller according to claim 1, comprising a slider mechanism for transferring the eccentric motion of the eccentric cam to the exhaust timing control valve.

3. An exhaust timing controller according to claim 1, including a straightening member having an upstream side end portion and a downstream side end portion, the straightening member extending smoothly to a portion of the exhaust timing control valve on the downstream side of the exhaust port, the exhaust timing control valve being retractable into the exhaust port, the upstream side portion of the straightening member pivoting on the exhaust timing control valve, the downstream side end portion of the straightening member slidably engaging and rotating on an inside wall portion of the exhaust port.

4. An exhaust timing controller according to claim 3, further comprising a slider mechanism between the downstream side end portion of the straightening member and the inside wall portion of the exhaust port.

5. An exhaust timing controller for a two-stroke cycle engine having a crank case, a cylinder block with a cylinder bore providing an inside wall surface, and a cylinder head, the crank case having a scavenging port having a suction end and an opposite end opening to the inside wall surface of the cylinder bore, an exhaust port passing through the cylinder block from the inside wall surface of the cylinder bore to the exterior of the block, the exhaust port having an open edge portion opening into the cylinder bore, the exhaust timing controller comprising:

an actuator means;

a housing disposed above and connected to the exhaust port;

an exhaust timing control valve disposed between the housing member and the cylinder block and adapted to change the height of the open edge portion on a top dead center side of the exhaust port; and means for transferring power from the actuator to the exhaust timing control valve, said power transferring means comprising:

a cam shaft disposed in the housing member and operatively connecting at one end of the cam shaft to the actuator means; and an eccentric cam member mounting on another end of the cam shaft and engaging the exhaust timing control valve.

6. An exhaust timing controller according to claim 5, further comprising a valve holder disposed between the housing member and the cylinder block, the exhaust timing control valve being held by the valve holder.

7. An exhaust timing controller according to claim 6, wherein the exhaust timing control valve comprises a sliding member having a thickness smaller than that of the valve holder so as to be slidable between the cylinder block and the housing member, and a valve body that moves with the sliding motion of the sliding member.

8. An exhaust timing controller according to claim 7, wherein the power transferring means further includes a slider mechanism disposed between the eccentric cam member and the exhaust timing control valve and adapted to transfer the eccentric motion of the eccentric cam member to the exhaust timing control valve.

9. An exhaust timing controller according to claim 8, wherein the sliding member has a recessed portion for horizontally accommodating a slider, the slider having a substantially circular hole corresponding to an outer profile of the eccentric cam member, the eccentric cam member being tightly fitted into the circular hole of the slider, the eccentric am member being rotatable in the circular hole.

10. An exhaust timing controller according to claim 9, wherein the sliding member has a substantially rectangular shape having one side edge with a groove, the groove opens toward the cam shaft, and a pivot of axis the straightening member fits into the groove.

11. An exhaust timing controller according to claim 10, further comprising a back shim for closing an open side of the recessed portion and the groove of the sliding member, the back shim having a through hole through which the cam shaft extends.

12. An exhaust timing controller according to claim 10, wherein the straightening member has a free end slidably and pivotally contacting a wall portion of the exhaust port through another slider mechanism.

13. An exhaust timing controller according to claim 5, wherein the power transferring means further includes a pulley mounted on the one end of the cam shaft and a cable means wound around the pulley at one of the cable means and connected to the actuator means at another end of the cable means.

14. The exhaust timing controller according to claim 7, wherein the valve body has an attached flange that moves with the sliding motion of the valve body, the flange being moved within a recess formed in the cylinder block for vertically accommodating the flange, the flange being between the valve body and the inside wall surface to prevent exhaust from passing between the valve body and inside wall surface when the exhaust timing control valve moves to change the height of the open edge portion on the top dead center side of the exhaust port.

15. The exhaust timing controller according to claim 5, wherein the cam shaft has an axis of rotation perpendicular to the axis of the cylinder bore in the cylinder block.

16. The exhaust timing controller according to claim 5, wherein the eccentric cam member is disposed above the exhaust port.

* * * * *

UNITED STATES PATENT AND TRADEMARK OFFICE
CERTIFICATE OF CORRECTION

PATENT NO. : 5,341,775
DATED : August 30, 1994
INVENTOR(S) : Kosaku YAMAUCHI et al It is certified that error appears in the above-indentified patent and that said Letters Patent is hereby corrected as shown below:

Attorney, Agent, or Firm, title page: Line 1 after "Henderson" insert --,--.

Claim 9, Column 10, Line 4 change "am" to --cam--.

Claim 10, Column 10, Line 9 change "of axis" to --axis of--.

Signed and Sealed this

Second Day of May, 1995

Attest:

BRUCE LEHMAN

Attesting Officer  Commissioner of Patents and Trademarks